United States Patent [19]

Inoue et al.

[11] Patent Number: 5,247,384
[45] Date of Patent: Sep. 21, 1993

[54] METHOD OF STABILIZING RESONANT FREQUENCY AND RESONANT SCANNER USING THE SAME

[75] Inventors: Yoshiaki Inoue; Katsuto Sumi, both of Kanagawa, Japan

[73] Assignee: Fuji Photo Film Co., Ltd., Kanagawa, Japan

[21] Appl. No.: 611,621

[22] Filed: Nov. 9, 1990

[30] Foreign Application Priority Data

Nov. 13, 1989 [JP] Japan .................. 1-294726

[51] Int. Cl.⁵ .................................. G02B 26/08
[52] U.S. Cl. ............................. 359/199; 359/213; 318/128; 310/36
[58] Field of Search ................. 359/213-214, 359/224, 198, 199; 250/235; 358/208; 310/208, 68 C, 36; 318/127, 128; 346/108

[56] References Cited

U.S. PATENT DOCUMENTS

| | | | |
|---|---|---|---|
| 4,214,154 | 7/1980 | Sato | 250/201 |
| 4,370,019 | 1/1983 | Shirasaki | 359/199 |
| 4,502,752 | 3/1985 | Montagu | 359/213 |
| 4,686,363 | 8/1987 | Schoon | 358/208 |
| 4,738,500 | 4/1988 | Grupp et al. | 359/214 |
| 4,855,761 | 8/1989 | Hiiro | 359/206 |
| 4,874,215 | 10/1989 | Montagu | 359/213 |
| 4,990,808 | 2/1991 | Paulsen | 310/208 |

FOREIGN PATENT DOCUMENTS 0295863 12/1988 European Pat. Off. .

Primary Examiner—Rodney B. Bovernick
Assistant Examiner—James Phan
Attorney, Agent, or Firm—Sughrue, Mion, Zinn, Macpeak & Seas

[57] ABSTRACT

A method of the present invention for stabilizing the resonant frequency of a resonant scanner is that thermal energy of the same amount as the heat generated in an optical scanning mode is applied to the scanner section in a non-scanning mode to insure that the variation of the temperature of the resonant light deflector will lie within a predetermined range, whereby the resonant frequency of the oscillation of the reflecting mirror is stabilized. The resonant scanner of the present invention in which the scanner section is heated in the non-scanning mode by supplying the drive coil with an electric current that has a non-resonant frequency or with the heater is constructed. The resonant scanner using the method is capable of achieving precise optical scanning that has an improved dimensional precision in the sub-scanning direction.

4 Claims, 6 Drawing Sheets

METHOD OF STABILIZING RESONANT FREQUENCY AND RESONANT SCANNER USING THE SAME

BACKGROUND OF THE INVENTION

1. Field of the Invention

This invention relates to a resonant light deflector, or a resonant scanner, for use with optical beam scanning apparatus that are required to perform precise optical scanning, such as image recording or reading apparatuses for use in the making of printing plates. More particularly, this invention relates to a resonant scanner that is capable of reducing the variations in resonant frequency due to the changes in the temperature of the scanner section during its operation.

2. Prior Art

An optical scanning apparatus in which a light beam deflected in the direction of main scanning performs two-dimensional scanning of an object being transported in the sub-scanning direction is used with various types of image recording and reading systems In this optical beam scanning apparatus, the light beam emitted from a light source such as a semiconductor laser is reflected and deflected in the direction of main scanning by means of a light deflector and the object being transported at a given speed in the sub-scanning direction which is generally perpendicular to the direction of main scanning is scanned two-dimensionally to perform image recording or reading.

While various types of light deflectors such as a polygonal mirror and a galvanometer mirror are employed in the optical beam scanning apparatus described above, a resonant light deflector which is generally referred to as a "resonant scanner" is commonly used with optical beam scanning apparatuses that are required to perform precise optical scanning, such as image recording or reading systems for use in the making of printing plates. In a resonant scanner, a reflecting mirror that deflects an incident light beam by reflection is allowed to oscillate by self-excitation at the inherent (resonant) frequency of a resonant drive system (a resonant drive mechanism) consisting of a movable section containing this reflecting mirror and a spring that elastically supports this movable section, and predetermined optical scanning is accomplished by controlling the resonant drive system, particularly the amplitude of its oscillation. The resonance by self-excitation of this resonant drive system is maintained by permitting a current having the resonant frequency to flow through the drive coil on a drive motor.

The resonant scanner described above suffers from the disadvantage that the resonant frequency will change with temperature. As mentioned in the previous paragraph, the resonant scanner oscillates the reflecting mirror by bringing into resonance the resonant drive system consisting of the movable section and the spring. If the moment of inertia of the movable section (including the reflecting mirror) is written as J and the spring constant of the spring as k, the resonant frequency f is expressed by:

$$f(Hz) = \frac{1}{2\pi}\sqrt{\frac{k}{J}}$$

If the magnitude of the electromagnetic force imparted by the magnet and the coil is written as M and the attenuation constant as C (assuming a proportional attenuation), the amplitude of oscillation $\theta_f$ of the resonant drive system is resonance is expressed by:

$$\theta_f = \frac{M}{C}\cdot\sqrt{\frac{J}{k}}$$

The resonant frequency and the amplitude of oscillation are both largely dependent on the spring constant of the spring and the magnetic flux passing through the magnet and the coil. However, as is well known, not only the spring constant but also the magnetic flux through the magnet and the coil will vary with temperature. Accordingly, the resonant frequency of the reflecting mirror will vary with the temperature of the scanner section. The principal reasons for such temperature-dependent variations of resonant frequency are the changes that occur in the spring characteristics of the leaf spring and the magnetic flux through the magnet on account of temperature variations and, further, the resulting changes in the amplitude of oscillation of the drive mechanism (including the reflecting mirror). Thus, the resonant frequency of a conventional scanner has temperature dependency which, when expressed by $(\Delta f/f)T$, is typically on the order of $-2\times 10^{-4}/°C$.

Figure 6:
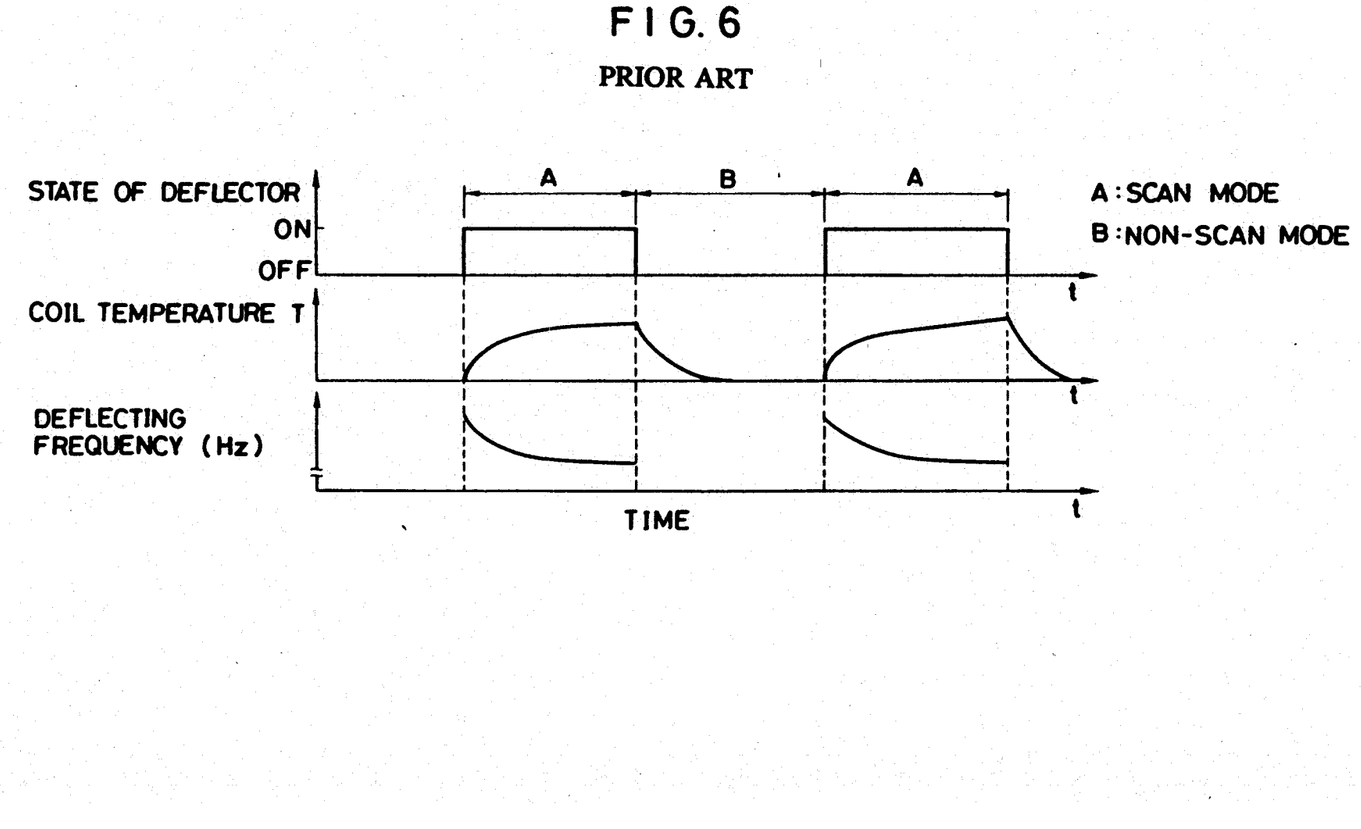
FIG. 6 is a timing chart for the operation of a prior art resonant light deflector.

To perform optical scanning, for example, image reading or writing (exposure) with an optical beam scanning apparatus using a resonant scanner having such temperature dependency, cycles of the following operation are repeated: the resonant scanner is first driven for a while until the resonant frequency is stabilized and, thereafter, actual two-dimensional optical scanning is initiated and the scanner is brought to a rest after the scanning is completed. As shown in FIG. 6, if the resonant scanner starts to be driven, the temperature T of the scanner section, particularly of the drive coil section, rises first rapidly, then gradually afterwards whereas the resonant frequency f decreases first rapidly, then gradually afterwards. As a result, the deflection frequency is high in the initial period of optical scanning and decreases gradually toward the end of optical scanning.

Therefore, if the temperature of the scanner section in the optical beam scanning apparatus changes, the resonant frequency of the scanner, or the frequency of the cycles of main scanning with a light beam will also vary, causing an error in the image size in the sub-scanning direction on account of the change in the interval between scanning lines. For instance, in the recording of a plurality of images where images are successively written, the first output image will have a different dimension from the second output image in the sub-scanning direction. If the feed speed in the sub-scanning direction is written as v, the output dimension as L and the number of main scanning lines in the dimension L as y, the interval between main scanning lines, $\Delta l$, is expressed by v/f (1/f is the period of optical scanning with the scanner) and, hence, $L=\Delta l\cdot y=(v/f)\cdot y$. Hence, the relationship between $\Delta f$, or the change in the resonant frequency f due to the change in the scanner section's temperature T by $\Delta T$, and $\Delta L$, or the change in the output dimension L in the sub scanning direction can be expressed by $\Delta L/L = -\Delta f/f$. If $\Delta T$ is 5° C. and L (the length of exposure in the sub-scanning direction) is 500 mm, $\Delta L=L(-\Delta f/f)=L(2\times 10^{-4}\cdot\Delta T)=0.5$ mm, and this presents a serious problem in application areas where high precision of optical scanning is required, particularly in the field of making color printing plates where image size is required to have an accuracy on the order of several tens of microns.

In order to solve this problem, it may be proposed that the temperature change that occurs in the coil section of the resonant scanner in an optical scanning mode and a non-scanning mode (see FIG. 6) when the resonant scanner is repeatedly driven and stopped should be eliminated by allowing the scanner to be continuously driven in the non-scanning mode. However, the life of the resonant scanner is determined by the sum of drive times for which the scanner is resonating, so driving the scanner continuously in a resonant state even in the non-scanning mode will shorten its life.

Instead of allowing the resonant scanner to be driven in the non-scanning mode as well as in the optical scanning mode, two improvements in the spring mechanism have been proposed. One improvement is characterized by the combined use of two springs having different temperature characteristics in the resonant scanner, the first spring having a constant that increases with temperature elevation and the second spring having a constant that decreases with temperature elevation. According to the other improvements, a magnetic spring is incorporated to compensate for the change in the spring constant of the spring used in the conventional resonant scanner due to temperature variation. However, the resonant scanner incorporating the first improvement suffers from the problem of low durability of springs; in addition, the combination of two springs having different temperature characteristics causes the movable part of the resonant drive system to oscillate in an imbalanced way, thus making it impossible to achieve correct optical beam scanning. The resonant scanner constructed according to the second improvement has the problem of complexity in mechanism. Furthermore, the magnetic spring, or a spring created by a magnetic circuit, has an unavoidable hysteresis loss which reduces the resonant oscillation of the mirror. To solve this problem, an increased current must be applied to the drive coil but then one great advantage of the resonant scanner, namely, its ability to cause the mirror to oscillate through large angles upon application of a small power, will be lost.

SUMMARY OF THE INVENTION

The present invention has been made in view of the above circumstances and has as an object providing a method of stabilizing the resonant frequency of a resonant scanner, by which the variations in resonant frequency due to the change in the temperature of the scanner section, namely the temperature change between an optical scanning (exposure or reading) mode and a non-scanning mode, can be reduced.

A further object of the present invention is to provide a resonant scanner that uses the above-described method to improve the precision of optical scanning, particularly the dimensional precision of output image during image exposure or reading and which yet adopts a simple and inexpensive construction.

To achieve its first object, the present invention provides according to the first aspect a method of stabilizing the resonant frequency of a resonant scanner in which a reflecting mirror is oscillated at an inherent resonant frequency to reflect incident light so that it is deflected in a one-dimensional direction to perform optical scanning, said method being characterized in that thermal energy is applied in a non-scanning mode to insure that the variation of the temperature of said resonant scanner will lie within a predetermined range, whereby the resonant frequency of the oscillation of the reflecting mirror is stabilized.

Preferably, the amount of said thermal energy being applied in a non scanning mode is the same as being generated at the resonant scanner in an optical scanning mode.

Preferably, said thermal energy is generated at a resonant drive means of the resonant scanner in a non-scanning mode.

Preferably, said thermal energy is applied to a resonant drive means of the resonant scanner by a heating means.

To achieve its second object, the present invention provides according to the second aspect a resonant scanner that comprises an oscillating reflective mirror that reflects incident light so that it is deflected in a one-dimensional direction to perform optical scanning, a resonant drive means that causes said reflective mirror to oscillate at an inherent resonant frequency, a control means for controlling said resonant drive means, a signal generator means which generates a signal having a frequency different from said resonant frequency, and a signal switching means that allows said signal to flow into said resonant drive means when said reflective mirror is in a non-scanning mode.

Preferably, said resonant drive means comprises a rotor on which the reflective mirror is fixed, a magnet fixed to one side of the rotor, a plurality of leaf springs to support the rotor elastically, and a coil section to drive the magnet.

Preferably, said control means comprises a feedback signal amplifier to amplify a pickup output voltage signal having said resonant frequency, a peak voltage detector to detect a peak voltage of the amplified pickup output voltage signal, a reference voltage generator to generate a reference voltage corresponding to a predetermined swing angle of the reflective mirror, a voltage computing means to calculate a differential voltage value between the peak voltage and the reference voltage, a controller to compute an amplitude correcting voltage value with the differential voltage value, a multiplier to multiply said voltage signal having the resonant frequency or said signal having the frequency different from the resonant frequency by the amplitude correcting voltage value, and an output amplifier to amplify the multiplied voltage signal so as to produce an adequate output current signal.

Preferably, said output amplifier produces the output current signal having to same current value not only by the signal having the resonant frequency, but also by the signal having the different frequency.

According to its second aspect, the present invention also provides a resonant scanner that comprises an oscillating reflective mirror that reflects incident light so that it is deflected in a one-dimensional direction to perform optical scanning, a resonant drive means that causes said reflective mirror to oscillate at an inherent resonant frequency, a control means for controlling said resonant drive means, and a heating means that heats said resonant drive means when said reflective mirror is in a non-scanning mode.

Preferably, said resonant drive means comprises a rotor on which the reflective mirror is fixed, a magnet fixed to one side of the rotor, a plurality of leaf springs to support the rotor elastically, and a coil section to drive the magnet.

Preferably, said heating means is mounted on the coil section.

Preferably, said heating means generates the same thermal energy in the non-scanning mode as that generated at the coil section in the optical scanning mode.

Preferably, said control means comprises a feedback signal amplifier to amplify a pickup output voltage signal having said resonant frequency, a peak voltage detector to detect a peak voltage of the amplified pickup output voltage signal, a reference voltage generator to generate a reference voltage corresponding to a predetermined swing angle of the reflective mirror, a voltage computing means to calculate a differential voltage value between the peak voltage and the reference voltage, a controller to compute an amplitude correcting voltage value with the differential voltage value, a multiplier to multiply said voltage signal having the resonant frequency by the amplitude correcting voltage value, and an output amplifier to amplify the multiplied voltage signal so as to produce an adequate output current signal.

Preferably, said heating means is a ceramic heater.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DESCRIPTION OF THE PREFERRED EMBODIMENTS

According to the method of the present invention for stabilizing the resonant frequency of a resonant scanner (which is a resonant light deflector), thermal energy of the same amount as the heat generated in an optical scanning mode (i.e., during exposure or image reading) is applied to the scanner section in a non-scanning mode (i.e., during non-exposure or non-image reading) so that the variation in the temperature of the scanner section is caused to lie within a predetermined permissible range throughout the period of its use. As a result, the resonant frequency of oscillation of the reflecting mirror which deflects incident light can be stabilized. In order to apply thermal energy to the scanner section, the resonant drive system in the resonant scanner, particularly the drive coil section, is heated either by feeding said drive coil with an electric current that is generated with an external signal generator and which has a frequency different from the resonant frequency of the resonant scanner or by means of a heater, whereby the variation in the temperature of the resonant drive system can be substantially reduced. Therefore, if the resonant scanner of the present invention is used with an ordinary optical beam scanning apparatus that performs optical scanning in an intermittent manner, possible variations in the resonant frequency of the scanner can be reduced since there are no temperature changes in alternating optical scanning and non-scanning periods.

In a non-scanning mode, the resonant drive system in the resonant scanner of the present invention is heated by supplying the drive coil with an electric current that is generated with the external signal generator and that has a non-resonant frequency. Alternatively, the resonant drive system may be heated with the heater. Whichever heating method is employed, the reflecting mirror is not caused to oscillate in resonance, so the life of the scanner will by no means be shortened by heating the resonant drive system.

Therefore, despite its simple and inexpensive construction, the resonant scanner of the present invention is capable of achieving precise optical scanning to produce an output image during imagewise exposure or reading that has an improved dimensional precision in the sub-scanning direction. Hence, the optical beam scanning apparatus using the resonant scanner of the present invention is applicable with particular advantage to the field of making color printing plates where highly precise image sizes are required.

The method of the present invention for stabilizing resonant frequency and the resonant scanner using that method are described below in detail with reference to the preferred embodiments shown in the accompanying drawings.

Figure 1:
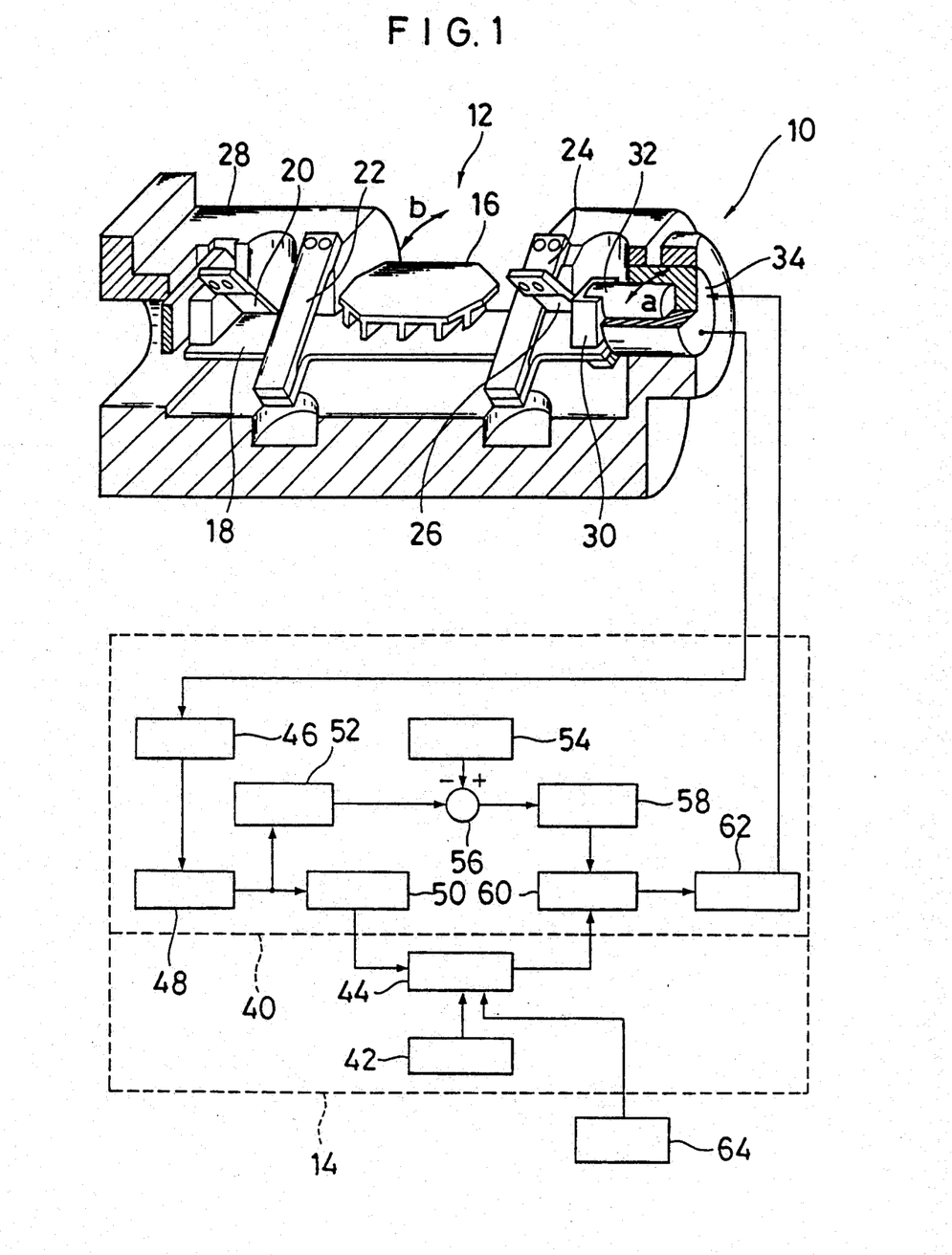
FIG. 1 is a perspective view showing schematically an example of the resonant scanner of the present invention which includes a control circuit.

FIG. 1 is a perspective view showing schematically an example of the resonant scanner, including a control circuit shown in block diagram, according to the second aspect of the present invention which adopts the resonant frequency stabilizing method according to the first aspect of the invention. The resonant scanner generally indicated by 10 comprises basically a scanner section 12 and a control circuit 14 for controlling the resonant frequency stabilizing method according to the first aspect of the present invention.

In the scanner section 12, a mirror 16 for reflecting a light beam is fixed on a rotor 18. The rotor 18 has leaf springs 20, 22, 24 and 26 fixed thereto in such a way that springs 20 and 22 are crossed with each other, with springs 24 and 26 being also crossed with each other. The four springs are fixed in a housing 28 to support the rotor 18.

A cylindrical magnet 32 is fixed via a fixing member 30 to the right side of rotor 18. The magnet 32 is inserted into a small space in a coil section 34. As shown conceptually in FIG. 2, the coil section 34 comprises a drive coil 36 and a pickup coil 38, with the magnet 32 and the drive coil 36 combining together to form a motor that drives the resonant scanner 10.

The rotor 18 (including the reflecting mirror 16), the fixing member 30 and the magnet 32 constitute a movable section which combines with the four leaf springs 20, 22, 24 and 26 to make up the resonant drive system in the resonant scanner of the present invention. This resonant drive system is oscillated by self-excitation at its inherent frequency, or resonant frequency, thereby causing the reflecting mirror 16 to oscillate at said resonant frequency.

If it is assumed that the movable section including the mirror 16 and the rotor 18 has an inertial moment of J whereas the leaf springs 20, 22, 24 and 26 have a spring constant of k, the inherent frequency of the oscillating means composed of the movable section and the leaf springs 20 –26, namely, the resonant frequency, f, of the resonant drive system in the resonant scanner of the present invention, can be expressed by:

$$f = \frac{1}{2\pi} \sqrt{\frac{k}{J}}.$$

The amplitude oscillation $\theta_f$ is expressed by:

$$\theta_f = \frac{M}{C} \sqrt{\frac{J}{k}} = \frac{1}{2\pi f}\left(\frac{M}{C}\right)$$

where M is an applied external force and C is an attenuation constant.

When a current having the resonant frequency f is applied from the control circuit 14 to the drive coil 36 in the scanner section 12, an external force of a predetermined amplitude that oscillates at the resonant frequency f is applied to the magnet 32 and the rotor 18 will accordingly pivot at the same frequency. The frequency of the applied external force is equal to the resonant frequency f of the resonant drive system consisting of the movable section including the mirror 16 and the rotor 18, as well as the leaf springs 20-26, so that resonant drive system will oscillate by self-excitation, causing the rotor 18 to rotate at a large amplitude $\theta_f$ which is typically about 300 times as great as the applied external force and, as a result, the reflecting mirror 16 fixed to the rotor 18 will swing at the amplitude $\theta_f$ and the resonant frequency f. Thus, using the resonant oscillation of the resonant drive system in the scanner section 12, the resonant scanner 10 of the present invention allows the reflecting mirror 16 to swing at the large amplitude $\theta_f$ upon application of a small external force. Further, the reflecting mirror 16 is fixed to the rotor 18 which is supported by the four leaf springs 20-26, so the resonant scanner 10 is a high-precision light deflector that will not cause a large amount of surface tilting that need be compensated.

Figure 2:
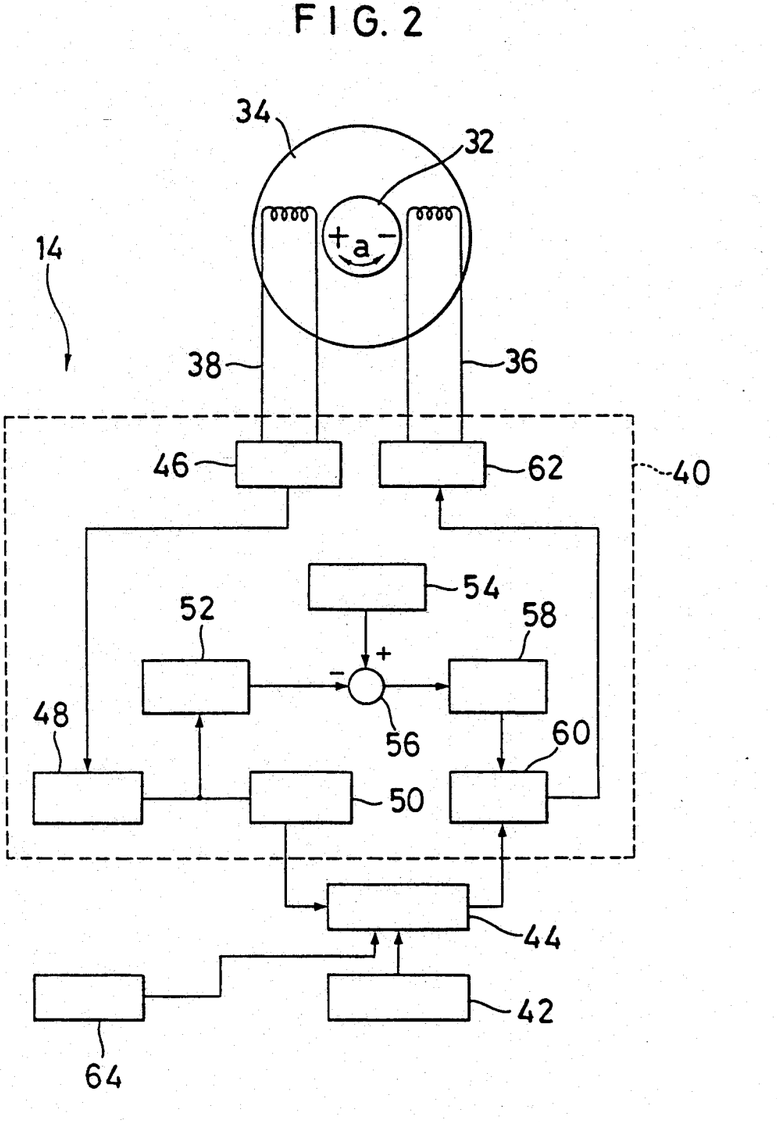
FIG. 2 is a block diagram showing the concept of the coil section and the control circuit in the resonant scanner shown in FIG. 1.

Signals indicating the amplitude an resonant frequency of the oscillation of the mirror 16 are detected by sensing the electromotive force that is induced in the pickup coil 38 on account of the change in flux density caused by the rotation of the magnet 32 Thus, as will be described more specifically below, the amplitude of oscillation, or the swing angle $\pm\theta_f$, of the reflecting mirror 16 in the scanner section 12 is detected with the pickup coil 38 and controlled to a predetermined value by means of the control circuit 14. Further, the current flowing through the drive coil 36 has its amplitude adjusted selectively so that the swing angle of the reflecting mirror 16 will become constant by means of the control circuit 14 on the basis of the voltage signal having the resonant frequency f which has been detected with the pickup coil 38. Hence, even if the resonant frequency varies on account of changes in the environmental factors such as temperature, the resonant drive system can always be controlled to oscillate at the resonant frequency. In other words, once it is activated, the resonant scanner 10 will continue to operate in resonance by self-excitation at a predetermined resonant frequency by merely applying a small amount of energy.

The control circuit 14 comprises a resonance control circuit 40 which serves as the control means in the resonant scanner of the present invention and which controls the resonant oscillation of the resonant drive system in the scanner section 12, an external signal generator means 42 which generates an external signal having a frequency different from the resonant frequency of the resonant drive system, and a single switching means 44 which, when the reflecting mirror 16 is not swinging, permits the external signal to be applied to the resonance control circuit 40 in place cf the internal signal which is produced in the resonance control circuit 40 by the pickup coil 38.

The resonance control circuit 40 comprises the following components: a waveform shaping means 46 connected to the pickup coil 38; a feedback signal amplifier 48 connected to the output side of the waveform shaping means 46; a phase compensator circuit 50 connected to the both output side of the amplifier 48 and the input side of the signal switching means 44; a peak voltage detector 52 also connected to the output side of the amplifier 48; a reference voltage generator 54 which generates a reference voltage; a voltage computing means 56 connected to both the peak voltage output side of the peak voltage detector 52 and the output side of the reference voltage generator 54; a controller 58 connected to the voltage computing means 56; a multiplier 60 connected to the output sides of the signal switching means 44 and the controller 58; and an output amplifier 62 connected to both the output side of the multiplier 60 and the drive coil 36.

The resonance control circuit 40 will operate as follows in an optical scanning mode where the reflecting mirror 16 in the resonant scanner 10 is swinging (this mode is hereinafter referred to as a "resonance by self-excitation mode"). A pickup output voltage signal having the resonant frequency f that is detected with the pickup coil 38 in response to the rotation of the magnet 32 is shaped by the waveform shaping means 46 which eliminates any unwanted noise and high-frequency components. Thereafter, the signal is amplified with the feedback signal amplifier 48. One component of the amplified signal is compensated in the phase compensator circuit 50 for any phase deviation that has occurred on account of waveform shaping or amplification and is thereafter fed as an internal signal into the signal switching means 44. Since the signal switching means 44 is in a resonance by self-excitation mode, the input voltage signal having the resonant frequency f will be directly transmitted to the multiplier 60.

The other component of the pickup output voltage signal that has been amplified with the amplifier 48 is fed into the peak voltage detector 52 to detect its peak voltage. The detected peak voltage is fed as a negative (minus) input to the voltage computing means 56, whereas a reference voltage corresponding to a predetermined swing angle that has been generated from the reference voltage generator 54 for adjusting the reflecting mirror 16 to swing through the predetermined angle is fed as a positive (plus) input to the voltage computing means 56, where the two inputs are added together. The differential voltage value obtained by the comparison effected in the voltage computing means 56 is then fed into the controller 58, where it is subjected to PID control to insure that the reflecting mirror 16 will swing through a constant angle, and the resulting voltage value that corresponds to the amount of amplitude correction to be fed back is transmitted to the multiplier 60.

The voltage signal having the resonant frequency f that has been supplied into the multiplier 60 from the signal switching means 44 is multiplied by the amplitude correcting voltage value also supplied to the multiplier 60 from the controller 58, and the resulting voltage signal having both an adequate amplitude $\theta_f$ corresponding to the predetermined swing angle of the reflecting mirror 16 and the resonant frequency f is current-amplified with the output amplifier 62 to produce an adequate output current signal, namely, a drive current signal having the adequate value of amplitude and the resonant frequency, which is then fed into the drive coil 36.

Thus, the resonant scanner 10 permits the reflecting mirror 16 to oscillate through the predetermined swing angle and at the inherent resonant frequency in the resonance by self-excitation mode.

On the other hand, in a non-scanning mode where the reflecting mirror 16 in the resonant scanner 10 is not swinging (this mode is hereinafter referred to as an "external signal mode"), the signal switching means 44 permits an external signal from the external signal generator 42 to be supplied into the multiplier 60 in place of the internal signal that has been produced from the phase compensator circuit 50 in the above-described resonance by self-excitation mode. The external signal generator 42 may be of any type that generates a signal having frequencies other than the resonant frequency f that will not drive the movable section including the rotor 18 in the scanner section 12 and which hence will not cause the reflecting mirror 16 to rotate. The external signal generator 42 may be any oscillator that generates a suitable frequency. The frequency of the external signal is not limited to any particular value as long as it differs from the resonant frequency f and it may be a higher frequency that is twice or three times the resonant frequency. The waveform of the external signal also is not limited to any particular shape and it may have any waveform such as a sine wave, a rectangular wave, a triangular wave or a sawtooth wave.

The timing of the activation of the signal switching means 44 which selects between a resonance by self-excitation mode and an external signal mode may be controlled with a detector (not shown) which detects the scanning light issued from the optical beam scanning apparatus with which the resonant scanner of the present invention is used. Alternatively, the signal switching means 44 may be so adapted that its operational timing is controlled by a timing control signal supplied from a control unit, for example, an image processing unit 64 (see FIG. 1) in the optical beam scanning apparatus.

In an external signal mode, the scanner section 12 is not driven and no electromotive force is induced in the pickup coil 38, so the peak voltage value detected with the peak voltage detector 52 may safely be regarded as zero. Accordingly, the reference voltage value generated from the reference voltage generator 54 is transmitted to the multiplier 60 via the controller 58, where it is multiplied with the voltage signal having a non-resonant frequency that has been generated from the external signal generator 42 and supplied to the multiplier 60 via the signal switching means 44. The resulting product signal having a predetermined amplitude and the non-resonant frequency is amplified with the output amplifier 62 to produce a drive current that will provide substantially the same power as the drive current produced in the resonance by self excitation mode, and this drive current is applied to the drive coil 36. Since the current applied in the external signal mode has substantially the same power as the current applied in the resonance by self-excitation mode, the amount of heat generation from the drive coil 36 and the overall temperature distribution in the scanner will be substantially the same in the two modes. Therefore, only a small temperature variation will occur in the coil section 34 as a result of changeover from the resonance by self-excitation mode to the external signal mode or vice versa.

Figure 3:
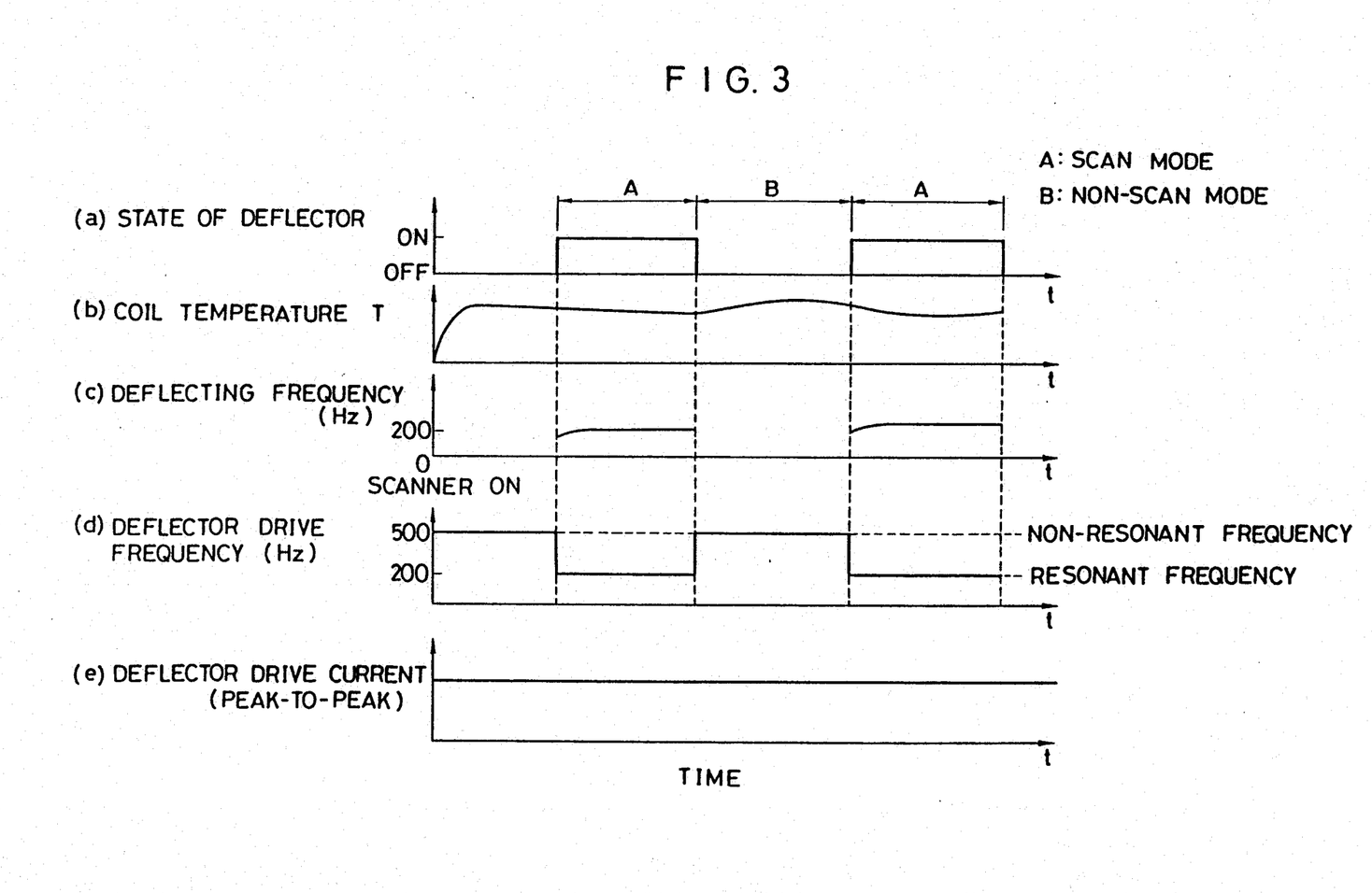
FIG. 3 is a timing chart showing the operation of the resonant scanner shown in FIG. 1.

FIG. 3 is a graph showing the relationship between time (t) with each of the following five parameters, (a) the state of deflector in the resonant scanner 10 adopting the stabilizing method according to the first aspect of the present invention, (b) the temperature T of the coil section 34, (c) the deflecting frequency of the frequency mirror 16; (d) the deflector drive frequency to the drive coil 36, and (e) the deflector drive current to the drive coil 36.

The operation of the first example of the resonant scanner 10 according to the second aspect of the present invention is described below with reference to FIG. 3. Prior to optical scanning with the optical beam scanning apparatus, a drive current in response to an external signal having a non-resonant frequency of 500 Hz that has been generated from the external signal generator 42 in an external signal mode is applied to the drive coil 36 to drive the resonant scanner 10. (see FIG. 3(d)). However, in the absence of resonance, the scanner section 12 does not start to operate and the reflecting mirror 16 will not oscillate but remain off (see FIG. 3(a)). On the other hand, the temperature T of the coil section 34 will first rise rapidly until it becomes stable at a substantially constant level or within a predetermined temperature range (see FIG. 3(b)).

After the temperature of the coil section has stabilized, the signal switching means 44 conducts a changeover from the external signal mode to a resonance by self-excitation mode, whereupon optical scanning is started. In this optical scanning mode indicated by A in FIG. 3, the scanner 10 is driven at the resonant frequency 200 Hz and the deflector turns on (see FIG. 3(a)), causing the reflecting mirror 16 to oscillate. Since the deflector drive current being applied to the drive coil 36 has a constant maximum amplitude (peak-to-peak value) (see FIG. 3(e)), the coil section 34 will keep generating substantially the same amount of heat. Accordingly, the temperature (T) of the coil section 34 will remain at a substantially constant level or will vary within a predetermined range (see FIG. 3(b)) and, as a result, the deflecting frequency of the reflecting mirror 16 will also substantially maintain the constant level of 200 Hz (see FIG. 3(c)).

When the period of optical scanning (i.e., exposure or image reading) is completed, the signal switching means 44 conducts a changeover from the resonance by self-excitation mode to an external signal mode to enter into a non-scanning mode B (see FIG. 3). In the non-scanning mode B, the deflector turns off (see FIG. 3(a)) and the reflecting mirror 16 will not oscillate. However, the drive coil 36 is supplied with an AC current that has a non-resonant frequency of 500 Hz (see FIG. 3(d)) and a maximum amplitude (see FIG. 3(e)) and hence the temperature T of the coil section 34 does not vary substantially and will instead maintain a substantially constant level as shown in FIG. 3(b).

As described above, an electric current that has a non-resonant frequency but which has the same amplitude as the current applied in the optical scanning mode A is allowed to flow into the drive coil 36 for driving the scanner 10 in the non-scanning mode B. Hence, even if a mode changeover is made from the non-scanning mode B to the scanning mode A, the resulting variation in the resonant frequency is extremely small on account of the very small change in the temperature of the coil section 34. As a consequence, the possible temperature change that will occur during the use of the resonant scanner 10 and, hence, the variation in resonant frequency that may occur during optical scanning with the scanner 10 can be reduced to an extremely low level, with the result that the variation in the size of output image (length of imagewise exposure or reading) in the sub-scanning direction during optical scanning, for example, imagewise exposure or reading, is reduced to a very small level. Because of these features, the optical beam scanning apparatus using the resonant scanner 10 of the present invention enables optical beam scanning to be performed with high precision.

A second example of the resonant scanner according to the second aspect of the present invention is described below in detail with reference to a resonant scanner which is shown by 70 shown in FIG. 4 as a preferred embodiment. The resonant scanner 70 shown in FIG. 4 has the same construction as the resonant scanner 10 shown in FIGS. 1 and 2 except for a ceramic heater 72, a heater drive power supply 74 and an associated timing control circuit 76 which constitute the heating means used in the resonant scanner according to the second aspect of the present invention. The components of the resonant scanner 70 which are identical to those shown in FIGS. 1 and 2 are identified by like numerals and will not be described in detail.

The ceramic heater 72 is used to heat the coil section 34 of the scanner section 12 and it may be of any type that satisfies the following condition: in the non-scanning mode B [see FIG. 3(a)] where the reflection mirror 16 in the resonant scanner 70 is not oscillating, the heater should supply the coil section 34 with the same amount of thermal energy as the heat that generated in the coil section in the optical scanning mode A, whereby the change in the temperature of the scanner 70, particularly in the coil section 34, that occurs as a result of the transition from the scanning mode A to the non-scanning mode B or vice versa will be so small as to lie within a predetermined range as shown in FIG. 3(b).

The heater drive power supply 74 is used to supply the ceramic heater 72 with the electric current necessary to generate heat that corresponds to the thermal energy generated in the coil section 34 in the optical scanning mode A.

In response to one optical scanning unit of timing information that consists of one sheet or one page or more than one line and which is supplied from a control circuit, say, image processing unit 64, in the optical beam scanning apparatus, the timing control circuit 76 turns off the power supply 74 to the ceramic heater 72 in the scanning mode so that a drive current to the drive coil 36 will flow out of a resonance control circuit 78. In the non-scanning mode where no drive current flows into the drive coil 36 from the resonance control circuit 78, the timing control circuit 76 turns on the power supply 74 to the ceramic heater 72. Thus, any circuit that is capable of performing on-off control on the ceramic heater 72 will suffice as the timing control circuit 76.

The scanner section 12 in the resonant scanner 70 is constructed in entirely the same way as shown in FIGS. 1 and 2. Further, the resonance control circuit 78 has an identical construction to the resonance control circuit 40 shown in FIGS. 1 and 2 except that the phase compensator circuit 50 is directly connected to the multiplier 60 and, hence, the construction of the circuit 78 will not be described in detail.

As already mentioned, the resonant frequency of a resonant scanner is generally dependent on temperature and the change of its resonant frequency with temperature as expressed by $(\Delta f/f)/\Delta T$ is typically on the order of $-2 \times 10^{-4}/°C$. While there are several reasons for the temperature change that can cause variations in resonant frequency, a typical reason is that the heat generated from the drive coil 36 during optical scanning is transmitted to the leaf springs 20-26 through the magnet 32, fixing member 30, rotor 18 or housing 28, whereby the temperature of the scanning section 12 and, hence, the leaf springs 20-26 will vary in a transition from the optical scanning mode to the non-scanning mode on vice versa. The principal reasons for such temperature-dependent variations of resonant frequency are the changes that occur in the spring characteristics of the leaf springs and the magnetic flux through the magnet on account of temperature variations and, further, the resulting changes in the amplitude of oscillation of the rotor 18 (and the mirror 16).

Figure 4:
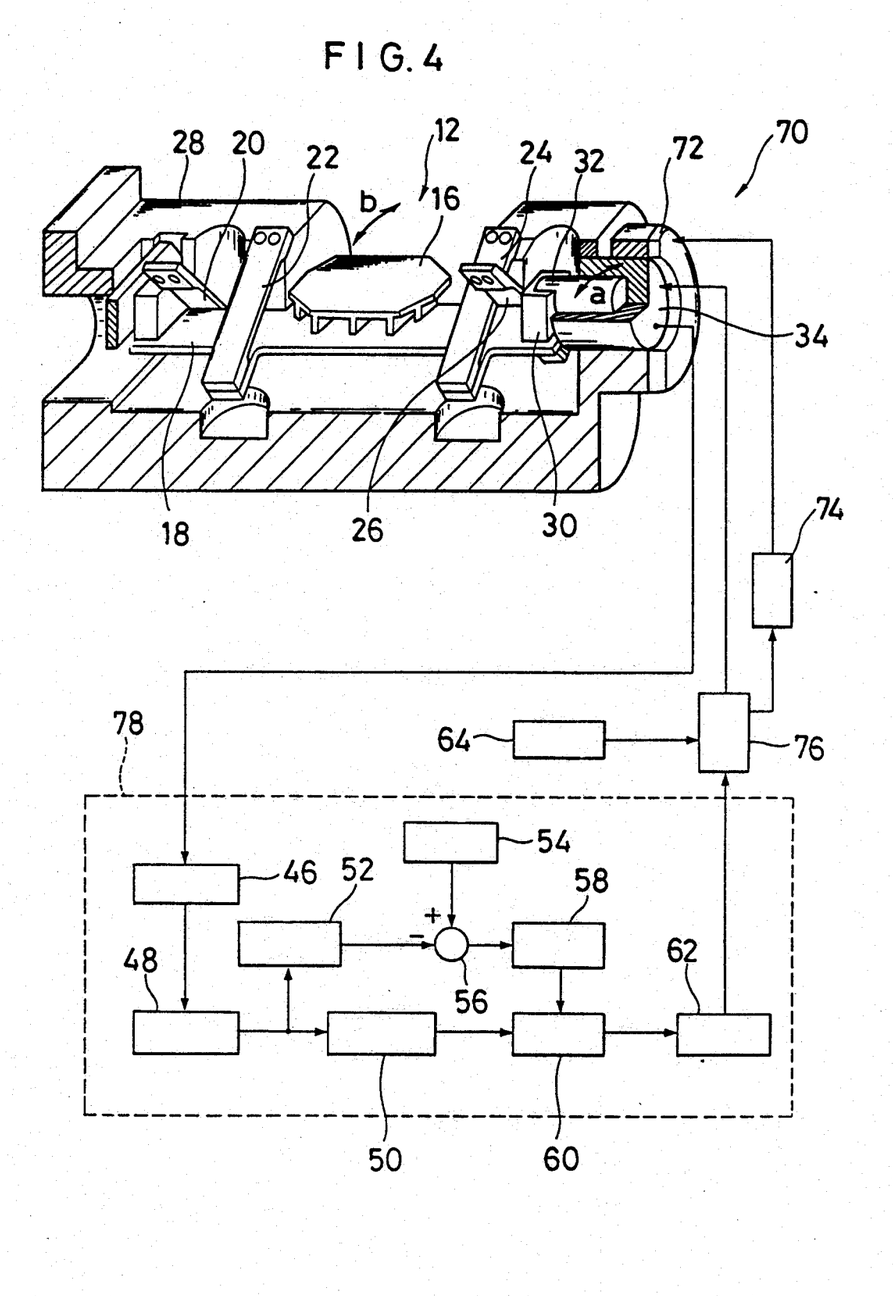
FIG. 4 is a perspective view showing schematically another example of the resonant scanner of the present invention which includes a control circuit.

Therefore, the heating means to be used in the second example of the resonant scanner according to the second aspect of the present invention is by no means limited to the ceramic heater 72 shown in FIG. 4 and it may be of any type by which the temperature profile of various parts of the scanner 70 when it is driven (in the optical scanning mode) can be retained even when it is not driven (in the non-scanning mode). Preferably, a heating element that is capable of controlling the amount of heat generation in an easy manner and which is also adapted for easy on-off control is used as the heating means. If desired, a transistor may be used as a heating element. Accordingly, the heating element such as the ceramic heater 72 need not be positioned around the coil section 34 as shown in FIG. 4 and it may be positioned near the housing 28 or the leaf springs 20-26 within the scanner section 12 or in any other locations as long as the temperature of the scanner section 12, particularly of the leaf springs 20-26 and the coil section 34, can be maintained at a substantially constant level.

Having the construction described above, the resonant scanner 70 heats the coil section 34 with the ceramic heater 72 even in the non-scanning mode B so that it is held at a temperature that is substantially the same as in the optical scanning mode A. As a result, even if the scanner is operated to alternate between the optical scanning mode A and the non-scanning mode B, the mirror 16 can be oscillated at a constant resonant frequency on every occasion of the scanning mode A.

In the two examples of the resonant scanner according to the second aspect of the present invention, the scanner section and the resonance control circuit are by no means limited to the embodiments described above and they may be equipped with various kinds of resonant drive systems that consist of springs and a movable section including a mirror.

Hence, the resonant scanner of the present invention may be used to realize an image recording or reading apparatus that is capable of producing an image having dimensional stability in the sub-scanning direction.

Figure 5:
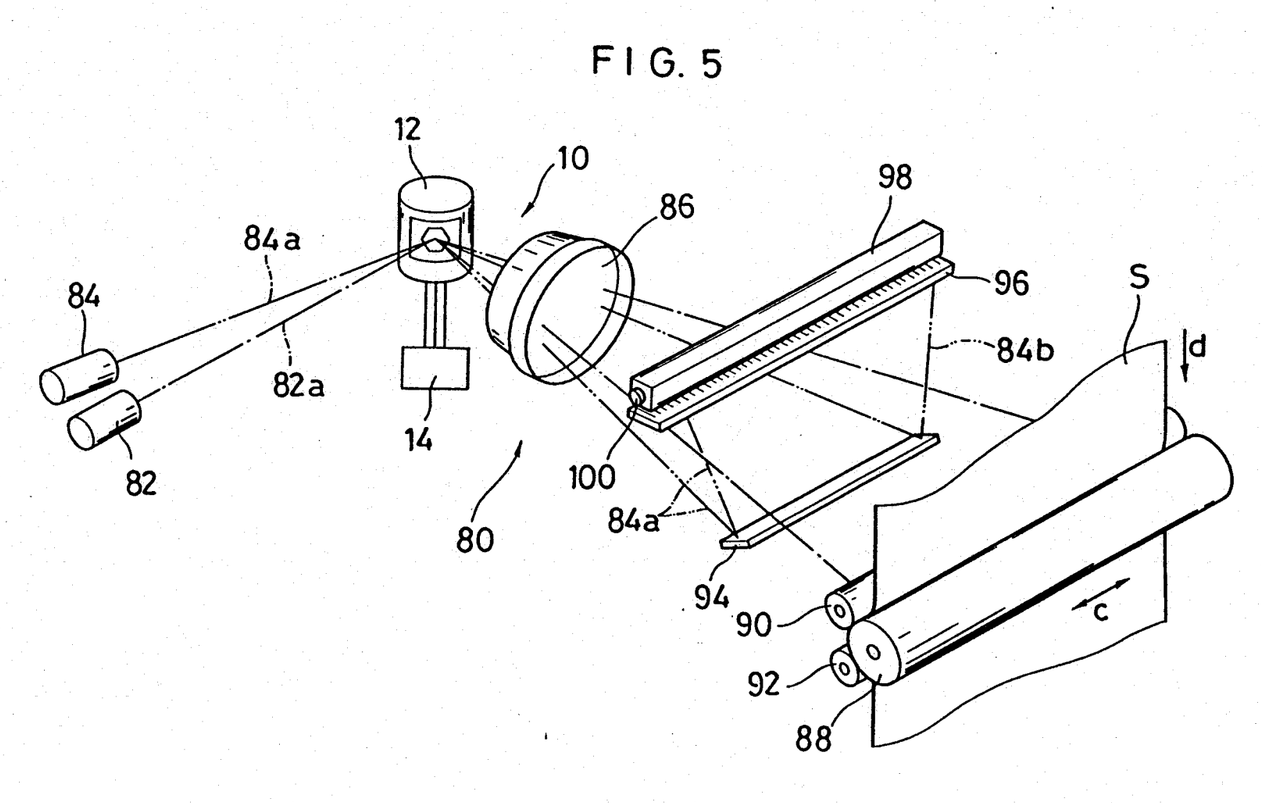
FIG. 5 is a perspective view showing schematically an image recording apparatus that uses the resonant scanner shown in FIG. 1.

FIG. 5 illustrates a further embodiment in which the resonant scanner 10 of the present invention is used with an image recording apparatus. The image recording apparatus which is generally indicated by 80 in FIG. 5 is adapted to record characters or line images by a raster scanning method using the resonant scanner 10 as a light deflector. This image recording apparatus 80 is composed of the following basic components: a recording unit 82 that emits a recording laser beam 82a (which is hereinafter referred to as a "recording beam 82a"); a grating unit 84 that emits a grating laser beam 84a (which is hereinafter referred to as a "grating beam 84a"); an fθ lens 86; an exposure drum 88 for retaining a recording material S in a predetermined position; nip rollers 90 and 92 for transporting the recording material S in contact with the exposure drum 88; an elongated mirror 94 for reflecting the grating beam 84a in a predetermined direction; and a grating 96 and a light collecting bar 98 that cooperate with each other to serve as a means of generating an image sync signal.

In the image recording apparatus 80 having the construction described above, the recording beam 82a and the grating beam 84a which are emitted from the units 82 and 84, respectively, are reflected and deflected by the resonant scanner 10 in the direction of main scanning indicated by the two-headed arrow c. The two beams are then adjusted by the fθ lens 86 in such a way that they respectively form predetermined beam spots on the surface of the recording material S. The spot of recording beam 82a focuses on the recording material S which is being transported by the exposure drum 88 in contact with the nip rollers 90 and 92 in the sub-scanning direction indicated by the arrow d. In other words, the recording material S is exposed by two-dimensional scanning with the recording beam 82a to record an image thereon. The grating beam 84a is reflected by the elongated mirror 94 to scan the grating 96 and produce an image sync signal, or a signal for detecting the position of the recording beam 82a.

The recording unit 82 which emits the recording beam 82a is a unitary assembly composed of a semiconductor laser that emits a recording optical beam and a collimator lens that shapes the optical beam emitted from said semiconductor laser.

The grating unit 84 emits the grating beam 84a and has essentially the same construction as the recording unit 82. Thus, it is a unitary assembly composed of a semiconductor laser serving as a light source for producing a grating scanning optical beam and a collimator lens that shapes the optical beam emitted from said semiconductor laser.

The recording beam 82a and the grating beam 84a emitted from the respective units 82 and 84 are then reflected by the resonant scanner 10 of the present invention and reflected in the main scanning direction indicated by the two-handed arrow c.

The optical beams reflected and deflected by the resonant scanner 10 are then launched into the fθ lens 86 and are so adjusted that they are focused at predetermined positions in the form of predetermined beam spots. The grating beam 84a passing through the fθ lens 86 is reflected upward by the elongated mirror 94 to scan the grating 96. The grating beam 84a passing through the grating 96 is collected by the collecting bar 98 and its quantity is measured with a photodetector 100 such as a photomultiplier tube for conversion to an electric signal.

The grating beam 84a incident on the grating 96 has been reflected and deflected in the main scanning direction (arrow c) by the resonant scanner 10 in entirely the same way as in the case of the recording beam 82a which is to scan the recording material S Hence, a sync signal for detecting the correct position of the recording beam 82a can be obtained from the electric signal that has been produced by the periodic change in the quantity of light in response to the scanning of the grating 96 with the grating beam 84a. The sync signal thus obtained allows the main scanning of the recording material S to be carried out in a more precise way by means of the recording beam 82a.

The recording beam 82a passing through the fθ lens 86 is focused on the recording material S on the exposure drum 88 that is being transported in the sub-scanning direction (arrow d) in contact with the nip rollers 90 and 92 as it is held in a predetermined image recording position, whereby said recording material S is exposed through two-dimensional scanning for image recording.

The image recording apparatus 80 described above uses the resonant scanner 10 of the present invention, so even if the scanner undergoes repeated drive and stop cycles in an optical scanning mode and a non-scanning mode, the frequency of the main scanning of the recording material S will not vary with temperature, thereby making it possible to record image having high dimensional stability in the sub-scanning direction. Therefore, the image recording apparatus 80 can be used advantageously in the making of printing plates, particularly color printing plates where reproduction of highly precise image sizes is required.

In an optical beam scanning apparatus using the resonant light deflector of the present invention, the resonant frequency may be measured with a frequency detector at the start of every scanning period. If the resonant frequency f varies by an amount $\Delta f$ on account of the change in an environmental factor such as temperature, the transport speed $v'$ in the sub scanning direction of an object being scanned, such as a light-sensitive material or a recording material may be adjusted to $v' = \Delta 1 \cdot (f + \Delta f)$ (where $\Delta 1$ is the interval between scanning lines) by controlling a servo motor or some other motor for transporting the object in the sub-scanning direction. By using the resonant scanner in combination with a sub-scanning speed control unit that is capable of performing this kind of control, the dimensional precision in the sub-scanning direction can be further improved. For details of this type of sub-scanning speed control unit which corrects a single point of resonant frequency through compensation for the change in the ambient temperature of use, see the specification of commonly assigned Japanese Patent Application Laid open No. Hei-1-64464 entitled "Apparatus for Controlling the Transport Speed of Object Being Scanned".

While the resonant scanner, or resonant light deflector, of the present invention has been described above on the basis of the preferred embodiments shown in the attached drawings, it should be understood that the invention is by no means limited to those particular embodiments and that various modifications and improvements can be made without departing from the spirit and scope of the invention.

As described on the foregoing pages, the method of stabilizing the resonant frequency of a resonant scanner according to the first aspect of the present invention is characterized by applying thermal energy to the resonant drive system in the deflector in a non-scanning mode. In the first example of a resonant scanner according to the second aspect of the present invention which adopts said method, a drive current is allowed to flow through the resonant drive system in the non-scanning mode in response to a signal having a non-resonant frequency. In the second example of the same deflector, the resonant drive system is heated by a heating means. In either aspect of the present invention, the resonant drive system in the non-scanning mode is provided with the same amount of heat as is generated in said drive mechanism during optical scanning. In this way, the variations in the temperature of the resonant drive system that will occur upon switching from the optical scanning mode to the non-scanning mode or vice versa are sufficiently reduced to insure that a substantially constant resonant frequency can be obtained in every instance of optical scanning mode.

Consequently, by using the resonant light deflector of the present invention, an image recording or reading can be realized that insures reproduction of images of the correct size in the sub scanning direction and which is particularly useful in application areas such as the making of printing plates where highly precise image sizes are required.

What is claimed is:

1. A resonant scanner which comprises an oscillating reflective mirror that reflects incident light so that it is deflected in a one-dimensional direction to perform optical scanning, a resonant drive means that causes said reflective mirror to oscillate at an inherent resonant frequency, a control means for controlling said resonant drive means, a signal generator means which generates a signal having a frequency different from said resonant frequency and a signal switching means that allows said signal to flow into said resonant drive means when said reflective mirror is in a non-scanning mode.

2. A resonant scanner according to claim 1 wherein said resonant drive means comprises a rotor on which the reflective mirror is fixed, a magnet fixed to one side of the rotor, a plurality of leaf springs to support the rotor elastically, and a coil section to drive the magnet.

3. A resonant scanner according to claim 1 wherein said control means comprises a feedback signal amplifier to amplify a pickup output voltage signal having said resonant frequency, a peak voltage detector to detect a peak voltage of the amplified pickup output voltage signal, a reference voltage generator to generate a reference voltage corresponding to a predetermined swing angle of the reflective mirror, a voltage computing means to calculate a differential voltage value between the peak voltage and the reference voltage, a controller to compute an amplitude correcting voltage value with the differential voltage value, a multiplier to multiply said voltage signal having the resonant frequency or said signal having the frequency different from the resonant frequency by the amplitude correcting voltage value, and an output amplifier to amplify the multiplied voltage signal so as to produce an adequate output current signal.

4. A resonant scanner according to claim 3 wherein said output amplifier produces the output current signal having to same current value not only by the signal having the resonant frequency, but also by the signal having the different frequency.

* * * * *